United States Patent
Dean

[11] 3,936,015
[45] Feb. 3, 1976

[54] RETRACTABLE COLLECTIVE PITCH STICK

[75] Inventor: James Clement Dean, Stratford, Conn.

[73] Assignee: United Technologies Corporation, Hartford, Conn.

[22] Filed: June 28, 1974

[21] Appl. No.: 484,182

[52] U.S. Cl. .............. 244/83 F; 74/471 R; 74/493
[51] Int. Cl.² ......................................... B64C 13/04
[58] Field of Search ........ 244/83 R, 83 A, 84, 83 F; 74/493, 495, 503, 527, 471 R; 135/46 T, 50

[56] References Cited
UNITED STATES PATENTS

| | | | |
|---|---|---|---|
| 993,121 | 5/1911 | Stone et al. .................. 135/46 T X |
| 2,514,212 | 7/1950 | Jennings ........................ 74/471 R X |
| 3,096,045 | 7/1963 | Hendrickson et al. ........ 244/83 R X |
| 3,169,409 | 2/1965 | Babacz ............................ 74/503 X |
| 3,491,663 | 1/1970 | Morgan ............................ 24/527 X |

*Primary Examiner*—Trygve M. Blix
*Assistant Examiner*—Barry L. Kelmachter
*Attorney, Agent, or Firm*—Russell M. Lipes, Jr.

[57] ABSTRACT

Telescoping collective pitch stick assembly with a locking mechanism for securing extended position and permitting retraction of the stick to facilitate ingress and egress of a pilot from his seat in a helicopter. The locking mechanism has an index pin and cam arrangement having a slot with three interconnected areas.

1 Claim, 2 Drawing Figures

RETRACTABLE COLLECTIVE PITCH STICK

The invention herein described was made in the course of or under a contract or subcontract thereunder with the U.S. Army Aviation Systems Command.

BACKGROUND OF THE INVENTION

1. Field of the Invention

This invention relates to flight control systems for helicopters and more particularly to a collective pitch stick which can be telescopically retracted to permit a pilot to more easily climb into and get out of his seat in the cockpit.

2. Description of the Prior Art

The cockpits of aircraft are characteristically crowded with instruments and controls and not only is a pilot somewhat limited in movement while in his seat, but it can be particularly difficult for him to climb into or out of his seat. In addition to a cyclic pitch stick located between the pilot's legs as a typical airplane control stick is located, helicopters have a collective control stick located at the left side of the pilot. This stick is designed to be raised or lowered to control the collective pitch of the helicopter rotor blades. When the door to the cockpit is at the left side of the cockpit, the collective pitch stick even in its lowered position can be an impediment to getting into and out of the pilot's seat.

A curved airplane control stick to minimize interference with a pilot's body is taught in Henricksen U.S. Pat. No. 1,874,522. Further, for student pilot training, a collapsible airplane control stick is taught in Palmer U.S. Pat. No. 2,272,817 and a yieldable airplane control system is taught in Marte U.S. Pat. No. 3,633,851. The concept of preventing a collective pitch stick from interfering with the escape apparatus from a disabled helicopter is taught in Valentine U.S. Pat. No. 3,361,397.

SUMMARY OF THE INVENTION

An object of this invention is to provide an improved control system for a helicopter.

Another object of this invention is to provide a collective pitch control stick for a helicopter which minimizes interference with pilot ingress or egress from his seat in the cockpit.

Still another object of this invention is to provide a collective pitch control stick for a helicopter which stick has the capability of being telescopically retracted to a position out of the way of the pilot when getting into or out of the pilot's seat.

The foregoing and other objects, features and advantages of the invention become more apparent in the light of the following detailed description of a preferred embodiment thereof, as illustrated in the accompanying drawing.

DESCRIPTION OF A PREFERRED EMBODIMENT

Figures 1, 2:
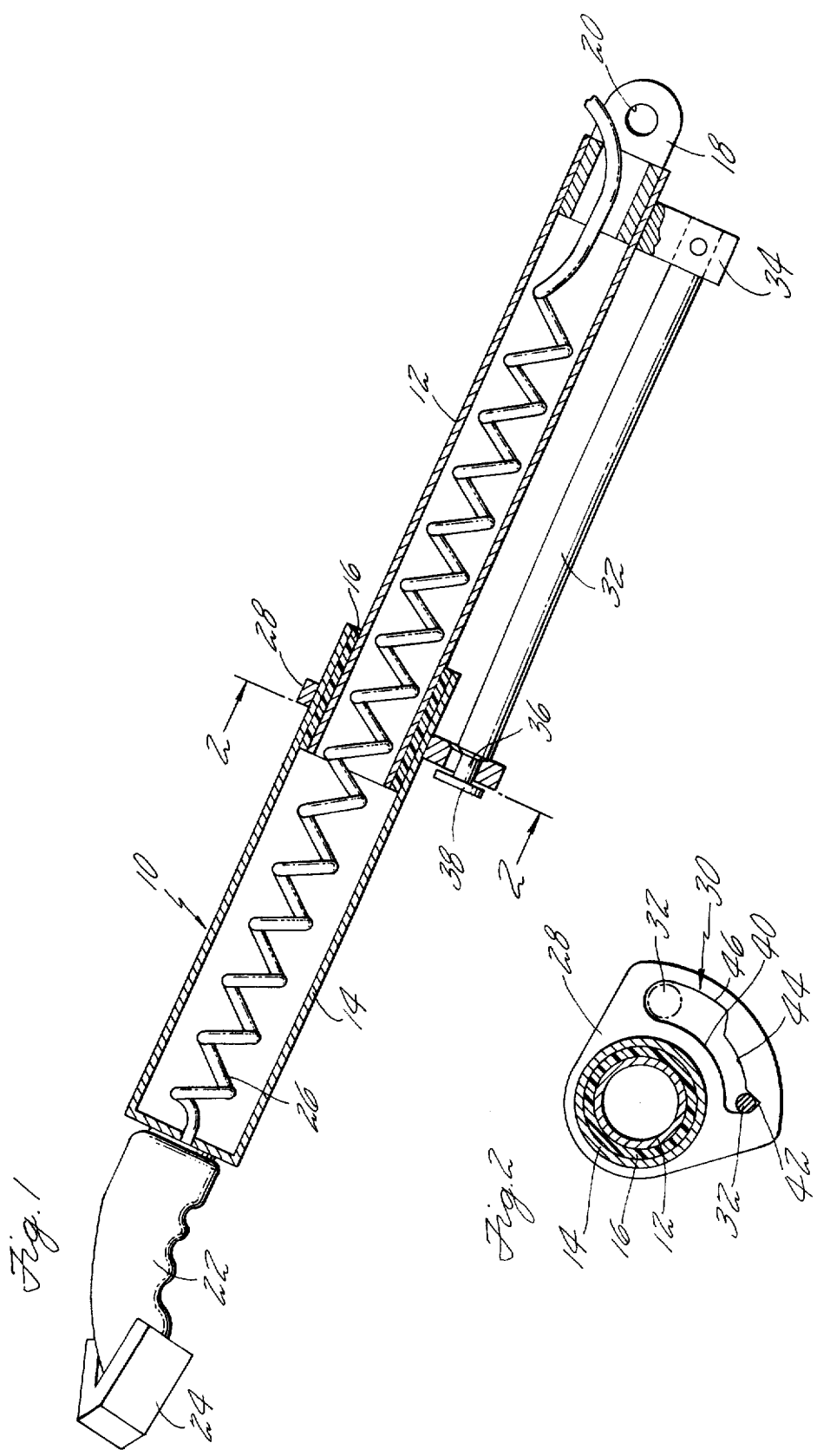
FIG. 1 is a schematic sectional view of a retractable collective pitch stick in accordance with this invention.
FIG. 2 is a section view along line 2—2 of FIG. 1.

Referring to FIG. 1, telescoping pitch stick 10 comprises lower inner tube 12 and upper outer tube 14 sized to slide over the inner tube. Slide 16, of a material like Teflon, attached to the interior of the outer tube separates the interior surface of the outer tube and the exterior surface of the inner tube. The slide is a guide and provides for relatively friction-free movement of the tubes with respect to each other during telescoping action. The bottom of the inner tube is pivotably mounted by means of plug 18 so that the pitch stick can rotate about pivot 20. The top of outer tube 14 has pilot grip 22 attached thereto on which is mounted switch box 24. Wire coil 26 extending along the interior of the pitch stick and through plug 18 connects switch box 24 to various helicopter controls, not shown.

Locking cam 28 surrounds a lower portion of outer tube 14 and is fixedly attached to the tube. The cam, as shown in FIG. 2, has arcuate slot 30 over a portion of its surface. The cam is designed to receive one end of index pin 32, the other end of which is anchored by bracket 34 attached to the lower end of inner tube 12. The index pin has necked-down portion 36 at its upper end for cooperative action with slot 30 for locking the pitch stick in its fully extended position and for permitting retraction or telescoping action. The index pin is surmounted by head portion 38, and it is preloaded with a light load tending to move the head end of the pin in a radial direction away from the pitch stick.

Slot 32 in locking cam 28 has inner wall 40 having a constant radius with respect to the axis of the pitch stick. The outer wall has a varying radius defining three general areas. As shown in FIG. 2, the left end of the slot has notch 42 into which necked-down portion 36 on index pin 32 can move. When the pin is in this detent, which has a width slightly larger than the diameter of necked-down portion 36 but smaller than the diameter of the pin, the pitch stick is in its locked position since locking cam 28 and outer tube 14 cannot move in an axial direction with respect to the pin. The radial preload on the pin tends to keep the pin in the detent. Mid portion 44 of slot 30 is the narrowest area of the slot, being only slightly wider than the diameter of necked-down portion 36 on the pin. Axial movement of outer tube 14 is not possible when the pin is in slot mid portion 44. The right end of the slot has area 46 which is slightly wider than the diameter of index pin 32. When the pin is in this area of the slot, telescoping action of the pitch stick is possible since the pin can slide through the slot in the locking cam.

When pitch stick 10 is in its normal extended position, the pilot can retract it by first turning grip 22 in a clockwise direction. As outer tube 14 and cam plate 28 rotate, index pin 32 moves out of notch 42 in slot 30 and along mid portion 44 to area 46. The pilot then can cause outer tube 14 to telescope over inner tube 12 until the limit of axial motion is reached. The pitch stick has then been retracted to a position permitting easier egress from the pilot's seat. To extend the pitch stick to its operational position, grip 22 is moved to cause the outer tube to move axially away from pivot 20 until locking cam 28 contacts pin head portion 38. The grip is then turned in a counterclockwise direction and index pin will move through slot 30 until it enters notch 42. The pitch stick then will be in its locked, extended position.

Although the invention has been shown and described with respect to a preferred embodiment thereof, it should be understood by those skilled in the art that the foregoing and other changes and omissions in the form and detail thereof may be made therein without departing from the spirit and scope of the invention, which is to be limited and defined only as set forth in the following claims.

I claim:

1. A collective pitch stick for a helicopter including:

a first tube having a first end connected for rotational movement of the tube in one plane about said connection and a second end remote from said first end;

a second tube having an internal diameter slightly larger than the external diameter of said first tube so as to be axially slideable thereon;

said second tube having a first end normally surrounding the second end of said first tube;

locking cam means attached to said first end of said second tube; and index pin means connected at one end to said first end of said first tube;

said index pin means having means adjacent its other end engaging with said locking cam means to maintain said tubes in a maximum length relationship;

said index pin means having a necked-down portion engaging said locking cam means;

said locking cam means having a slot through which said index pin extends;

said slot having three interconnected areas including;

a first area having a width slightly larger than the diameter of said index pin;

a second area having a width slightly larger than the diameter of the necked-down portion of said index pin; and a third area being a detent having a width larger than the diameter of the necked-down portion but smaller than the diameter of said index pin;

said index pin being preloaded so as to urge it into the detent of said slot third area.

* * * * *